United States Patent
Judson

(10) Patent No.: US 7,054,662 B2
(45) Date of Patent: May 30, 2006

(54) METHOD AND SYSTEM FOR FORWARD LINK BEAM FORMING IN WIRELESS COMMUNICATIONS

(75) Inventor: Bruce A. Judson, San Luis Obispo, CA (US)

(73) Assignee: Qualcomm, Inc., San Diego, CA (US)

( * ) Notice: Subject to any disclaimer, the term of this patent is extended or adjusted under 35 U.S.C. 154(b) by 598 days.

(21) Appl. No.: 09/771,137

(22) Filed: Jan. 24, 2001

(65) Prior Publication Data

US 2002/0098872 A1 Jul. 25, 2002

(51) Int. Cl.
*H04M 1/00* (2006.01)
(52) U.S. Cl. .................. 455/562.1; 455/25; 342/368
(58) Field of Classification Search ............ 455/69, 455/562.1, 561, 63.1, 63.4
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,634,199 A | 5/1997 | Gerlach et al. | |
| 5,848,358 A * | 12/1998 | Forssen et al. | 455/437 |
| 5,889,494 A * | 3/1999 | Reudink et al. | 342/373 |
| 6,006,110 A | 12/1999 | Raleigh | |
| RE37,218 E * | 6/2001 | Densmore et al. | 343/713 |
| 6,400,335 B1 * | 6/2002 | Weaver et al. | 343/853 |
| 6,421,005 B1 * | 7/2002 | Weaver et al. | 342/367 |
| 6,574,211 B1 * | 6/2003 | Padovani et al. | 370/347 |
| 2002/0077111 A1 * | 6/2002 | Spaling et al. | 455/453 |
| 2003/0050071 A1 * | 3/2003 | Shurvinton | 455/452 |

FOREIGN PATENT DOCUMENTS

| | | |
|---|---|---|
| GB | 2335115 | 9/1999 |
| WO | 98/14024 | 4/1998 |
| WO | 0072465 | 11/2000 |

OTHER PUBLICATIONS

S. Yoshimoto, et al. "Research and Development Project for Efficient Use of the Radio Spectrum Through Intelligent Technology," Sep. 1995, vol. 41, No. 3 (pp. 245-252).

(Continued)

*Primary Examiner*—Sonny Trinh
*Assistant Examiner*—Sam Bhattacharya
(74) *Attorney, Agent, or Firm*—Philip Wadsworth; Sandra L. Godsey; Thomas R. Rouse

(57) ABSTRACT

According to one embodiment, an antenna beam pattern is used to send a communication signal to a user. For example, the antenna beam pattern can be formed using adaptive antenna array technology on the forward link of a wireless communication system. A control signal from the user is used to determine a statistic. For example, the control signal can be a power control bit sent by the user on the return link. The statistic can be an average of the power control bit values over a specified time interval. The statistic is used to narrow the antenna beam pattern and direct it toward the user. For example, a dithering algorithm can be used to optimize the antenna beam pattern. After a call is completed, an optimized antenna beam pattern specific to each user can be stored for the next call to make the optimizing process faster and more efficient.

18 Claims, 3 Drawing Sheets

OTHER PUBLICATIONS

K. Nakamura, et al., "A System of Compensation of Rain Attenuation for Satellite Broadcasting With the Multi-Beam Antenna," Kagoshima University, ITE Technical Report, Jan. 1997. vol. 21 No. 5 (pp. 15-20).

Y. Hara et al., "Power control Scheme for CDMA Systems with Multibeam Antenna," Mitsubishi Electric Corporation, Kanagawa (Japan). The Institute of Electronics, Information and Communication Engineers, Technical Report of IEICE, Feb. 1999 (pp. 111-116).

* cited by examiner

METHOD AND SYSTEM FOR FORWARD LINK BEAM FORMING IN WIRELESS COMMUNICATIONS

BACKGROUND

1. Field

The present invention generally relates to the field of wireless communication systems. More specifically, the invention relates to adaptive antenna array techniques for code division multiple access communication systems.

2. Related Art

In wireless communication systems several users share a common communication channel. To avoid conflicts arising from several users transmitting information over the communication channel at the same time requires the use of some form of multiple access protocol, such as Code Division Multiple Access (CDMA). In addition to providing multiple access allocation to a channel of limited capacity, a protocol can serve other functions, for example, providing isolation of users from each other, i.e. limiting interference between users, and providing security by making interception and decoding difficult for a non-intended receiver, also referred to as low probability of intercept.

In CDMA systems each signal is separated from those of other users by coding the signal. Each user uniquely encodes its information signal into a transmission signal. The intended receiver, knowing the code sequences of the user, can decode the transmission signal to receive the information. The encoding of the information signal spreads its spectrum so that the bandwidth of the encoded transmission signal is much greater than the original bandwidth of the information signal. For this reason CDMA is also referred to as "spread spectrum" modulation or coding.

The energy of each user's signal is spread across the channel bandwidth so that each user's signal appears as noise to the other users. So long as the decoding process can achieve an adequate signal to noise ratio, i.e. separation of the desired user's signal from the "noise" interference of the other users' signals, the information in the signal can be recovered. Other factors which affect information recovery of the user's signal are different conditions in the environment for each subscriber, such as fading due to shadowing and multipath. Briefly, shadowing is interference caused by a physical object interrupting the signal transmission path between the transmitter and receiver, for example, a large building. Multipath is a signal distortion which occurs as a result of the signal traversing multiple paths of different lengths and arriving at the receiver at different times. Multipath is also referred to as "time dispersion" of the communication channel. Multipath fading may also vary with time. For example, the amount of multipath fading can vary rapidly as a result of the signal reflecting off of moving objects such as cars or trees blowing in the wind.

In wireless communications, especially in voice communications, it is desirable to provide communication between two users in both directions simultaneously, referred to as duplexing or full-duplexing. One method used to provide duplexing in CDMA systems is frequency division duplexing. In frequency division duplexing, one frequency band is used for communication from a base station to a user or "subscriber unit", called the "forward" channel, and another frequency band is used for communication from the user or subscriber unit to the base station, called the "reverse" channel. A forward channel may also be referred to as a "downlink" channel, and a reverse channel may also be referred to as an "uplink" channel or a "return link". Specific implementation of coding and modulation may differ between forward and reverse channels.

One collection of techniques which can be used to increase signal reliability is referred to as "power control". Simply stated, power control adjusts the power of the signal at the transmitter while the signal is being transmitted in order to compensate for varying conditions in the communication channel, such as relative movement of different users and multipath fading. One object of power control is to keep the power transmitted to each user at a minimum level needed to maintain a reliable communication link, thereby minimizing the interference between different users' signals discussed above. For example, power control can be implemented on a forward link by having each user receiving unit periodically send power control information to the base station transmitter. In one typical CDMA system, the power control information is in the form of a bit which is sent every 1.25 milliseconds. For example, if the bit has values of +1 and −1, the +1 can be interpreted as information that the receiver has a weak signal, i.e. the receiver needs more power transmitted to it, and the −1 can be interpreted as information that the receiver has a strong signal, i.e. the receiver can get by on less power transmitted to it. Thus, the base station can adjust the signal power transmitted to each user separately in order to minimize the interference between users by optimizing the signal power for each user.

Adaptive antenna array technology can also be used to minimize the interference between users. Adaptive antenna array technology can be used to focus and direct the energy in a transmitted signal into a "beam" which can be used to dramatically increase the efficiency of signal transmission. The shape of the beam can be altered. For example, the beam can be made narrow or wide. The beam can also be "pointed" or "steered" in different directions. The particular shape and direction of a beam transmitted from an antenna array is referred to as the "antenna beam pattern". By narrowing the antenna beam pattern directed to a specific user, interference is reduced or eliminated for other users which are outside the specific user's antenna beam pattern, thereby helping to minimize the interference between users. As interference between users is reduced, system capacity is increased, that is, a greater number of users are able to simultaneously use the system.

There are a number of approaches for using adaptive antenna array technology in wireless communication systems. Some of the approaches are described in U.S. Pat. No. 6,006,110, entitled "Wireless Communication Network Using Time-Varying Vector Channel Equalization For Adaptive Spatial Equalization" and assigned to Cisco Technology, Inc., San Jose, Calif.

In one approach for using adaptive antenna array technology at the base station, the base station estimates the angle of arrival of the signal received from the user. The base station then uses the angle of arrival estimate to form an estimate for an angle of transmission. With frequency duplexing, as discussed above, the received signal and the transmitted signal are on different frequencies, so that the radio frequency channel differs for the two signals. Depending on the degree of correlation in direction between the two channels at different frequencies, the estimate for the angle of transmission is a better or worse approximation. To the extent that the approximation is inaccurate, a wider antenna beam pattern must be used, limiting the reduction in interference between users with this approach.

In a second approach, the base station transmits an orthogonal pilot signal on each antenna element of the adaptive antenna array. The user's subscriber unit determines the amplitude and phase of each pilot signal, and the subscriber unit reports that information back to the base station on the return link. The base station uses the information to form a narrow beam directed toward the user. This approach requires extra bandwidth on the return link to transmit the pilot signal amplitude and phase information, i.e. non-user information, on the return link, i.e. the reverse channel. To the extent that channel capacity is used to transmit non-user information, less channel capacity is available for transmitting user information. In other words, an "overhead" is incurred for signal transmission on the return link, and the effective bandwidth efficiency of transmission on the return link is reduced. Moreover, this approach entails added complexity at the subscriber unit, which can involve added cost for the subscriber unit. Thus, this second approach is not "backward compatible" in the sense that introducing it into an existing CDMA communication system would require modification or replacement of a large number of subscriber units for the improvement to be effective.

Thus, there is a need in the art for reducing interference between users and for increasing system capacity by providing signal transmission using accurate antenna beam patterns. There is also a need in the art to form accurate antenna beam patterns without incurring signal transmission overhead on the return link. Further, there is a need in the art to provide signal transmission systems using accurate antenna beam patterns which are backward compatible with existing systems and which do not increase the complexity and cost of subscriber units.

SUMMARY

The present invention is directed to method and system for forward link beam forming in wireless communications. In one aspect, the invention overcomes the need in the art for reducing interference between users and for increasing system capacity by providing signal transmission using accurate antenna beam patterns. According to one embodiment of the invention, accurate antenna beam patterns are formed on the forward link without incurring signal transmission overhead on the return link. In one aspect the invention provides accurate antenna beam patterns for signal transmission systems in a way which does not increase the complexity and cost of subscriber units and which is backward compatible with existing systems.

According to an aspect of the invention an antenna beam pattern is used to send a communication signal to a user. For example, the antenna beam pattern can be formed using adaptive antenna array technology on the forward link of a wireless communication system. A control signal from the user is used to determine a statistic. For example, the control signal can be a power control bit sent by the user on the return link. The statistic can be an average of the power control bit values over a specified time interval. The statistic is used to narrow the antenna beam pattern and direct it toward the user. For example, a dithering algorithm can be used to optimize the antenna beam pattern. After a call has been completed, an optimized antenna beam pattern specific to each user can be stored for the user's next call in order to make the antenna beam pattern optimizing process faster and more efficient.

DETAILED DESCRIPTION

The presently disclosed embodiments are directed to method and system for forward link beam forming in wireless communications. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
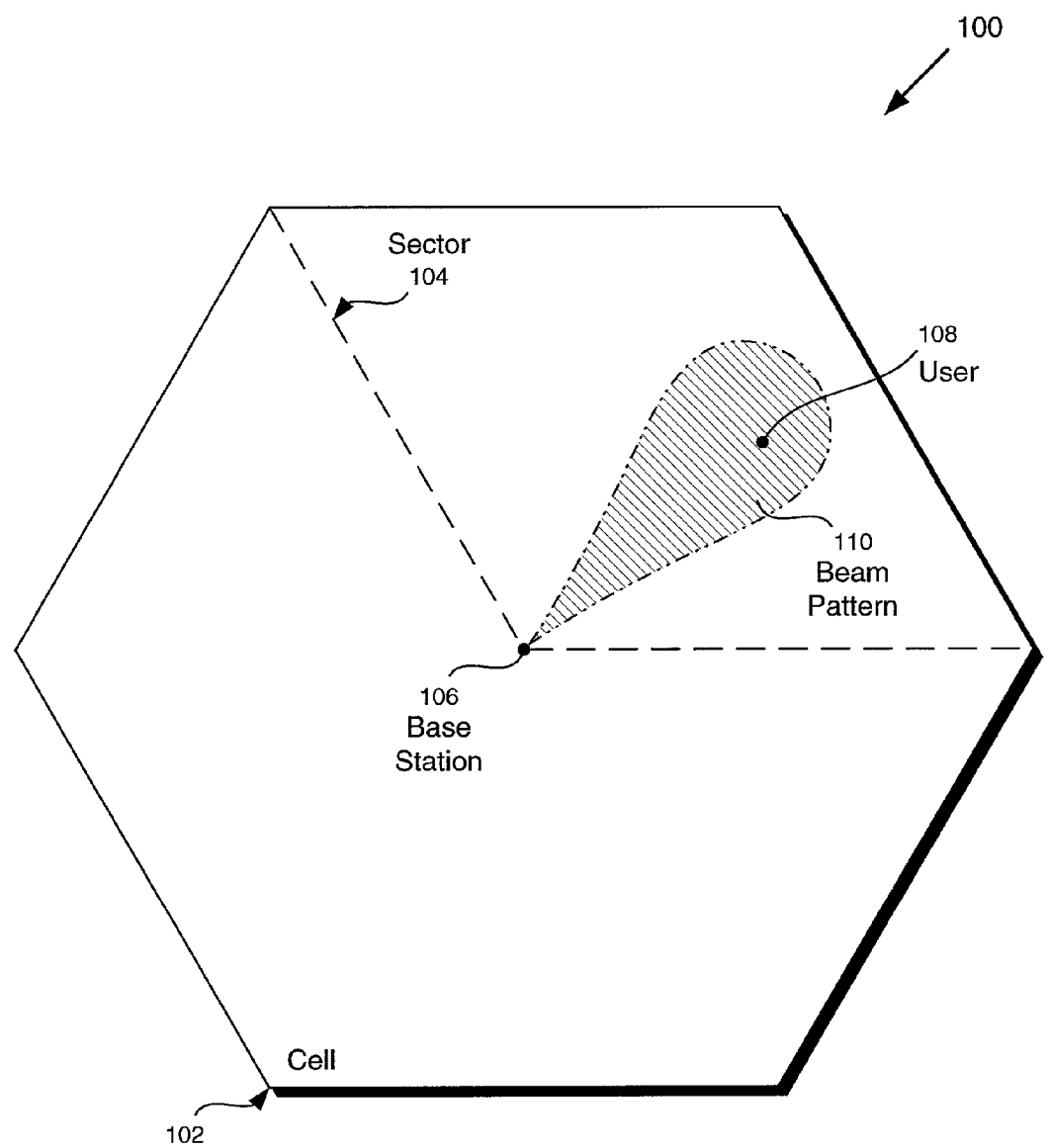
FIG. 1 is an illustrative representation of a sectored cell, with an example of an antenna beam pattern directed toward a user in an exemplary wireless communication system.

FIG. 1 illustrates an example of wireless communication in a sectored cell using adaptive antenna array beam forming in accordance with one embodiment. Exemplary system 100 shown in FIG. 1 constitutes part of an exemplary cellular communication system, which can be, for example, a Wideband Code Division Multiple Access ("WCDMA") communication system. A WCDMA communication system is also referred to as a "spread spectrum communication system".

The general principles of CDMA communication systems, and in particular the general principles for generation of spread spectrum signals for transmission over a communication channel are described in U.S. Pat. No. 4,901,307, entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention may utilize time multiplexing of data and various principles related to "high data rate" communication systems, and the present invention can be used in "high data rate" communication systems, such as that disclosed in U.S. patent application Ser. No. 08/963,386, entitled "Method and Apparatus for High Rate Packet Data Transmission" filed on Nov. 3, 1997, and issued on Jun. 3, 2003 as U.S. Pat. No. 6,574,211, and assigned to the assignee of the present invention. The disclosure in U.S. Pat. No. 6,574,211 is also hereby fully incorporated by reference into the present application.

Continuing with FIG. 1, exemplary system 100 comprises cell 102. Cell 102 can be, for example, one of a number of cells in a WCDMA system. Cells in a WCDMA system are typically divided into 3 sectors. Sectoring of the cells provides various benefits such as more efficient allocation of orthogonal spreading codes, for example. In the example used to illustrate one embodiment in the present application, cell 102 is a sectored cell and includes sector 104. Base station 106 provides communication for users in all sectors of cell 102 and, in particular, in the present example, provides communication to user 108 in sector 104. The present example illustrates communication taking place in a forward channel, i.e. from base station 106 to the subscriber unit of user 108. Adaptive antenna array technology is used at base station 106 to form antenna beam pattern 110 which is directed toward user 108.

Antenna beam pattern 110 is used to transmit a communication signal which includes user information that is to be sent across the communication channel to user 108. The communication channel can be, for example, radio frequency transmission between transmit and receive antennas in a wireless communication system. Antenna beam pattern 110 has been narrowed to focus the signal transmission energy in the direction of user 108, rather than spreading the signal transmission energy across the entire width of sector 104. The interference for users other than user 108 caused by the communication signal transmitted in antenna beam pattern 110, which is intended for user 108, is thereby reduced. Thus, FIG. 1 illustrates one example of a system in which adaptive antenna array technology is used to minimize interference between multiple users in a WCDMA wireless communication system.

Figure 2:
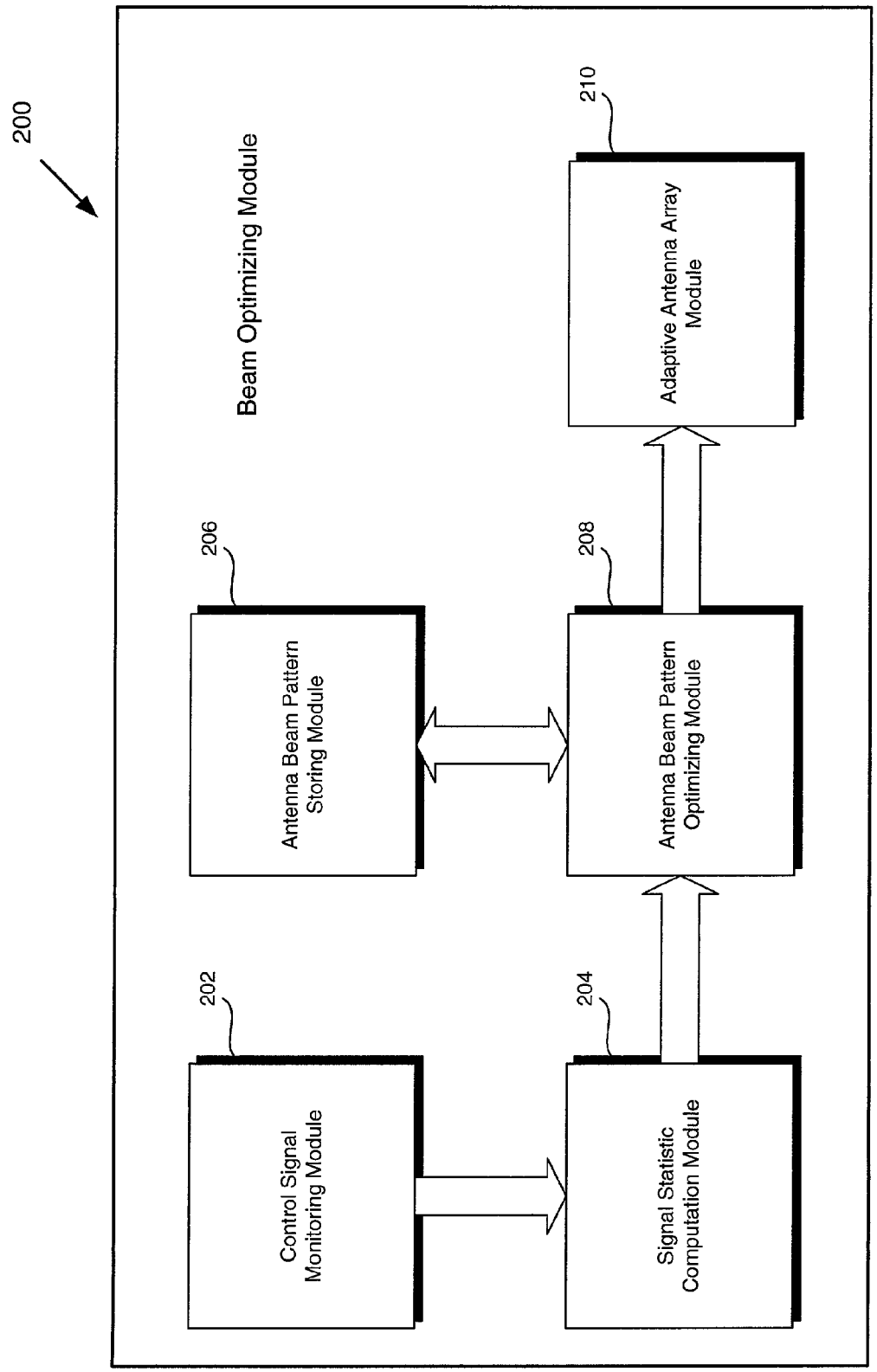
FIG. 2 is a block diagram showing the flow of information in an example beam optimizing module in accordance with one embodiment of the present invention in an exemplary wireless communication system.

FIG. 2 illustrates an example antenna beam optimizing module in accordance with one embodiment. Beam optimizing module 200 as shown in FIG. 2 constitutes part of a transmitter which may generally reside in a base station, gateway, or satellite repeater when communication is taking place in a forward channel. Beam optimizing module 200 can be part of a base station transmitter, for example, in a WCDMA communication system or spread spectrum communication system. Beam optimizing module 200, as shown in FIG. 2, comprises a control signal monitoring module 202, a signal statistic computation module 204, an antenna beam pattern storing module 206, an antenna beam pattern optimizing module 208, and an adaptive antenna array module 210. The flow of information between modules is indicated in the block diagram of FIG. 2 by the arrows between modules, which also indicate the direction of information flow.

Continuing with FIG. 2, control signal monitoring module 202 comprises hardware for reading a control signal returned by the user on the return link and making the information in the signal available at the output of control signal monitoring module 202. For example, the control signal can be a power control bit which appears on the return link approximately every 1.25 milliseconds, as discussed above. The power control bits can be stored in a buffer or register, for example, or can be passed directly to other modules in the system. Although the present example uses power control signals to illustrate one embodiment, it is manifest that other existing user feedback control signals can be used without sacrificing the invention's advantages of not increasing complexity at the subscriber unit and backward compatibility. For example, the Data Rate Control ("DRC") signal can be used in a wireless data communication system such as a High Data Rate ("HDR") communication system. The details of implementing control signal monitoring module 202 for a particular type of control signal are apparent to a person of ordinary skill in the art.

Continuing with the present example, power control signal bits are output by control signal monitoring module 202 to signal statistic computation module 204. The output of control signal monitoring module 202 is also referred to as a "sequence of monitored signals". As described above, the power control bit can be configured to alternate between +1 and −1 depending on whether the subscriber unit requires more or less signal power. Thus, the power control signal bits are responsive to noise in the channel such as multipath fading. The power control signal is, therefore, a noisy signal which requires filtering in order to be useful. In the present example, the power control signal is filtered by averaging the power control bits over time. An average value of the power control bits can be output by signal statistic computation module 204 periodically, for example, every 100 milliseconds. As another example, signal statistic computation module 204 can keep a running average which is output and then reset each time the value is read by another module. In the present example, signal statistic computation module 204 outputs the average value of the power control bits for a time interval which begins after each time antenna beam pattern optimizing module 208 reads an average value from the output of signal statistic computation module 204.

Continuing with FIG. 2, antenna beam pattern storing module 206 stores an optimized antenna beam pattern specific to each user. The optimized antenna beam pattern resulting from each user's previous call is saved for each specific user. Then, at the beginning of the user's next call, the optimized antenna beam pattern specific to that user, from the user's previous call, can immediately be used to transmit communication signals from the base station to that specific user. The antenna beam pattern is re-optimized during the call, and at the end of the call the latest optimized antenna beam pattern is stored for the user. If there was no previous call for a user, or the user's optimized antenna beam pattern was not previously stored, a standard antenna beam pattern can be used. For example, a standard antenna beam pattern can be a 120 degrees wide pattern which transmits to the entire sector. The standard antenna beam pattern is then optimized during the call, and at the end of the call the optimized antenna beam pattern is stored for the user. Thus, storing an optimized antenna beam pattern specific to each user increases the efficiency of the system, and shortens the time required to achieve an optimized antenna beam pattern for users that have a previously stored optimized antenna beam pattern.

Continuing with FIG. 2, antenna beam pattern optimizing module 208 begins with either a standard antenna beam pattern or the optimized antenna beam pattern specific to the user from the user's previous call, as described above, and optimizes the antenna beam pattern. In the present example, the algorithm used by antenna beam pattern optimizing module 208 to optimize the antenna beam pattern is a "dithering" algorithm. Operation of the dithering algorithm can be illustrated by the following example. A known antenna beam pattern is used to transmit a communication signal to the user. The known antenna beam pattern can be the standard antenna beam pattern, as described above, or the user's previously stored pattern, or the antenna beam pattern used at any intermediate stage of the optimization. The known antenna beam pattern is then narrowed by removing a specific portion or "slice" of the beam from one side of the pattern.

Antenna beam pattern optimizing module 208 then reads the average value from the output of signal statistic computation module 204. If the value indicates that no change in power is required by the user (the user is still "inside" the pattern), then another slice of the beam is removed from one side of the pattern. If the value indicates that an increase in power is required by the user (the user is suddenly "outside" the pattern), then the previously removed slice of the beam is restored to the pattern, and a slice is removed from the other side of the pattern. Antenna beam pattern optimizing module 208 reads the average value from the output of signal statistic computation module 204 after each change to the antenna beam pattern. In this manner, the antenna beam pattern is simultaneously narrowed and directed toward the user. The process of narrowing and directing the antenna beam pattern, i.e. optimizing the antenna beam pattern, continues throughout the duration of the call. At the termination of the call, the optimized antenna beam pattern is stored by antenna beam pattern storing module 206, as described above.

Continuing with FIG. 2, adaptive antenna array module 210 translates the antenna beam pattern information in the form of complex number valued weights into amplitude and phase information provided to each antenna element of the antenna array in order to form the antenna beam pattern of the signal transmitted by the antenna array. For example, the antenna beam pattern can be used to transmit a signal conforming to the antenna beam pattern from the antenna array as known in the art.

Thus, FIG. 2 shows an example of a system that can be used to provide optimized formation of antenna beam patterns for communication signal transmission in a wireless communication system in order to minimize interference between multiple users and thereby increase system capacity.

Figure 3:
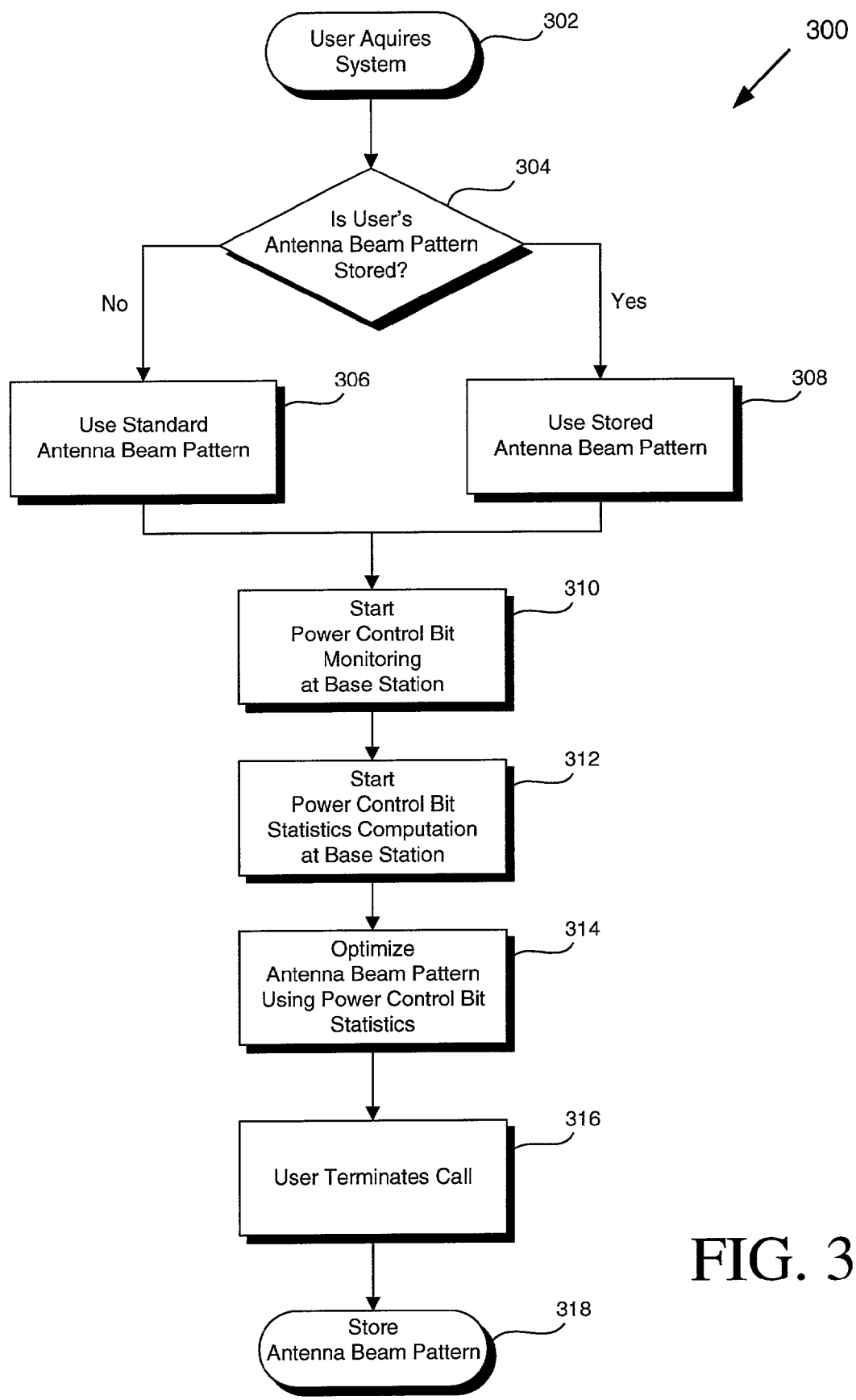
FIG. 3 is a flowchart describing one example of a process of providing accurate beam forming in accordance with one embodiment of the present invention in an exemplary wireless communication system.

FIG. 3 shows a flowchart 300 describing one example of a process of providing accurate beam forming in accordance with one embodiment. Flowchart 300 shown in FIG. 3 describes a process which can be performed at a transmitter which may generally reside in a base station, gateway, or satellite repeater when communication is taking place in a forward channel. The process shown in flowchart 300 can be performed by a beam optimizing module, for example, in a base station transmitter in a WCDMA communication system or spread spectrum communication system.

Referring to FIG. 3, at step 302 the process for optimizing an antenna beam pattern begins with a user acquiring the system. For example, acquiring the system may comprise several steps including the transmission of probe signals, completing various "handshake" protocols and "training periods", and allocation of various system resources such as orthogonal spreading codes. When a user acquires the system, the system has information that can be used to identify the specific user, for example, a user specific mask or electronic serial number ("ESN"). The identifying information can be used at step 304 to determine whether an antenna beam pattern has been stored for the specific user that has acquired the system.

When a pattern has not been previously stored, then the process proceeds at step 306, and a standard antenna beam pattern is used to transmit a communication signal back to the user prior to beginning optimization of the antenna beam pattern. When a pattern has been previously stored, then the process proceeds at step 308, and a previously stored antenna beam pattern specific to the user is used to transmit a communication signal back to the user prior to beginning optimization of the antenna beam pattern. As described above, the use of a previously stored pattern can decrease the time required to optimize the antenna beam pattern.

At step 310 the process starts power control bit monitoring. Power control bit monitoring comprises accessing information from the power control subsystem of the wireless communication system as described above. Although power control is used to illustrate the present example, other types of feedback information can be used. For example, data rate control or DRC information can be used in a data communication system, as apparent to a person of ordinary skill in the art. The process of power control bit monitoring continues throughout the duration of the call.

At step 312 the process starts power control bit statistics computation. In the present example, successive values of the power control bit are averaged. As described above, a number of different methods for averaging exist. For example, the average can be computed over a specific interval of time, 100 milliseconds for example, and the average value can be output every 100 milliseconds. As another example, the averaging computation can be restarted each time an average value is read and continued until the next time an average value is read, restarted again and so forth. Although a simple average is used to illustrate the present example, other types of averaging can be used, for example, weighted averages. The process of power control bit statistics computation continues throughout the duration of the call.

At step 314 the process starts antenna beam pattern optimization using a dithering algorithm as described above. The process of antenna beam pattern optimization continues throughout the duration of the call. At step 316 the user terminates the call, relinquishing the system resources which have been allocated to the user. In a communication system where user locations are stationary, the final optimized beam pattern of the call correlates to the antenna beam pattern needed for the next call. Therefore, the efficiency and initial response time of the system is improved by storing the final optimized antenna beam pattern from the call at step 318. After the optimized antenna beam pattern from the call is stored at step 318, the process for optimizing an antenna beam pattern ends.

Thus, FIG. 3 shows an example of a process that can be used to provide optimized formation of antenna beam patterns for communication signal transmission in a wireless communication system in order to minimize interference between multiple users and thereby increase system capacity.

It is appreciated by the above description that the invention provides method and system for forward link beam forming in wireless communications. According to an embodiment of the embodiments described above, user information is transmitted in a communication signal from a base station to a user using adaptive antenna array technology to form a narrow antenna beam pattern directed toward a user. The antenna beam pattern is optimized for each particular user, thus minimizing signal interference between multiple users in a wireless communication system and resulting in increased system capacity. Moreover, according to an embodiment of the invention described above, the method of narrowing and directing the antenna beam pattern toward a user provides more accurate beam forming and better optimization than other methods. Although the invention is described as applied to communications in a CDMA system, it will be readily apparent to a person of ordinary skill in the art how to apply the invention in similar situations where accurate antenna beam pattern forming is needed to increase system capacity and reduce interference between users in a wireless communication system.

From the above description, it is manifest that various techniques can be used for implementing the concepts of the present invention without departing from its scope. Moreover, while the embodiments have been described with specific reference to certain embodiments, a person of ordinary skill in the art would recognize that changes can be made in form and detail without departing from the spirit and the scope of the invention. For example, different existing feedback control signals, such as Data Rate Control (DRC) signals, can be used as well as the power control signal used in the present example. Also, for example, the dithering algorithm presented in one embodiment described here, can be replaced by other algorithms for optimizing the beam pattern. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, the method and system for forward link beam forming in wireless communications have been described.

What is claimed is:

1. A method for forward link beam forming in a wireless communication system, comprising:

forming a plurality of antenna beam patterns, each of the antenna beam patterns having a corresponding signal transmission energy and being directed to a plurality of users of the wireless communication system;

determining a statistic for a specific user among the plurality of users, said statistic comprising an average of a power control signal over a specified time interval from the specific user;

narrowing one of the antenna beam patterns based solely on the statistic of the specific user and focusing the signal transmission energy of said one antenna beam pattern on the specific user to obtain an optimized antenna beam pattern for the specific user; and using the optimized antenna beam pattern to transmit communication signals to the specific user.

2. The method of claim 1, further comprising storing the antenna beam patterns.

3. The method of claim 1, wherein each of the antenna beam patterns is narrowed through a dithering algorithm.

4. The method of claim 1, wherein the statistic of the specific user is further determined from a data rate control signal from the specific user.

5. The method of claim 1, wherein the average comprises a running average of the power control signal from the specific user.

6. The method of claim 1, wherein the average comprises a weighted average of the power control signal from the specific user.

7. The method of claim 1, the antenna beam patterns are formed using an adaptive antenna array.

8. The method of claim 1, further comprising communicating with the specific user over the forward link of the wireless communication system using the antenna beam pattern directed thereto.

9. The method of claim 8, wherein the wireless communication system comprises a wideband code division multiple access communication system.

10. A system for forward link beam forming in a wireless communication system, comprising:

an antenna configured to generate a plurality of antenna beam patterns, each of the antenna beam patterns having a corresponding signal transmission energy and being directed to a plurality of users of the wireless communication system;

a control signal monitoring module configured to receive a power control signal from a specific user among the plurality of users and to output a sequence of monitored signals;

a signal statistic computation module configured to determine a statistic for the specific user, said statistic comprising an average of the sequence of monitored signals from the control signal monitoring module over a specified time interval;

an antenna beam pattern optimizing module configured to narrow one of the antenna beam patterns based solely on the statistic of the specific user and focusing the signal transmission energy of said one antenna beam pattern on the specific user to obtain an optimized antenna beam pattern for the specific user; and a base station using the optimized antenna beam pattern to transmit communication signals to the specific user.

11. The system of claim 10, wherein the antenna comprises an adaptive array module configured to output and direct each of the antenna beam patterns to its respective user.

12. The system of claim 10, further comprising an antenna beam pattern storing module configured to store the antenna beam patterns.

13. The system of claim 10, wherein the antenna beam pattern optimizing module uses a dithering algorithm to narrow the antenna beam patterns.

14. The system of claim 10, wherein the statistic is further determined from a data rate control signal from the specific user.

15. The system of claim 10, wherein the average comprises a running average of the sequence of monitored signals from the control signal monitoring module.

16. The system of claim 10, wherein the average comprises a weighted average of the sequence of monitored signals from the control signal monitoring module.

17. The system of claim 10, wherein each of the antenna beam patterns is capable of supporting forward link communications in the wireless communication system.

18. The system of claim 17, wherein the wireless communication system comprises a wideband code division multiple access communication system.

* * * * *